(12) United States Patent
Mauchly

(10) Patent No.: US 8,786,670 B2
(45) Date of Patent: Jul. 22, 2014

(54) NETWORK SYNCHRONIZATION VIDEO FOR COMPOSITE VIDEO STREAMS

(75) Inventor: J. William Mauchly, Berwyn, PA (US)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 12/904,493

(22) Filed: Oct. 14, 2010

(65) Prior Publication Data

US 2012/0092443 A1 Apr. 19, 2012

(51) Int. Cl.
*H04N 7/14* (2006.01)

(52) U.S. Cl.
USPC ...................................................... 348/14.12

(58) Field of Classification Search
USPC .......................... 348/14.08, 14.09, 14.12, 521
See application file for complete search history.

(56) References Cited

U.S. PATENT DOCUMENTS

| 2003/0193577 A1* | 10/2003 | Doring et al. ............. 348/211.99 |
| 2009/0067507 A1 | 3/2009 | Baird et al. |
| 2011/0205433 A1* | 8/2011 | Altmann ....................... 348/513 |

OTHER PUBLICATIONS

Serge Defrance et al., SMPTE/EBU Joint Task Force: Time & Synchronization "Transmission of a Video Synchronization Signal Over Ethernet/IP Network," CR/CP&M Lab. (Rennes/France); 802.1 AS—Oct. 2008.
Gael Mace et al., "Using Ethernet in the HD Studio," Jun. 1, 2008, Broadcast Engineering; http://www.broadcastengineering.com/hdtv/using-ethernet-hd-studio-0601/index1.html; 2008 Penton Media, Inc.

* cited by examiner

*Primary Examiner* — Duc Nguyen
*Assistant Examiner* — Thoedore Ndje
(74) *Attorney, Agent, or Firm* — Edell, Shapiro & Finnan, LLC

(57) ABSTRACT

Techniques are provided for upstream video sources to be synchronized in vertical sync time and in frame rate, so that a downstream device can create a composite image with low latency. At a video compositor device, a plurality of video streams are received that include at least first and second video streams. First and second vertical synchronization points associated with the first and second video streams points are determined. A difference in time between the first and second vertical synchronization points is determined. At least one control signal or message is generated that is configured to change a video capture frame rate associated with one or both of the first and second video streams to reduce the difference in time and the control message is sent to video capture devices for one or both of the first and second video streams. Techniques are also provided for upstream video sources, e.g., cameras, to receive the control message and respond accordingly.

20 Claims, 9 Drawing Sheets

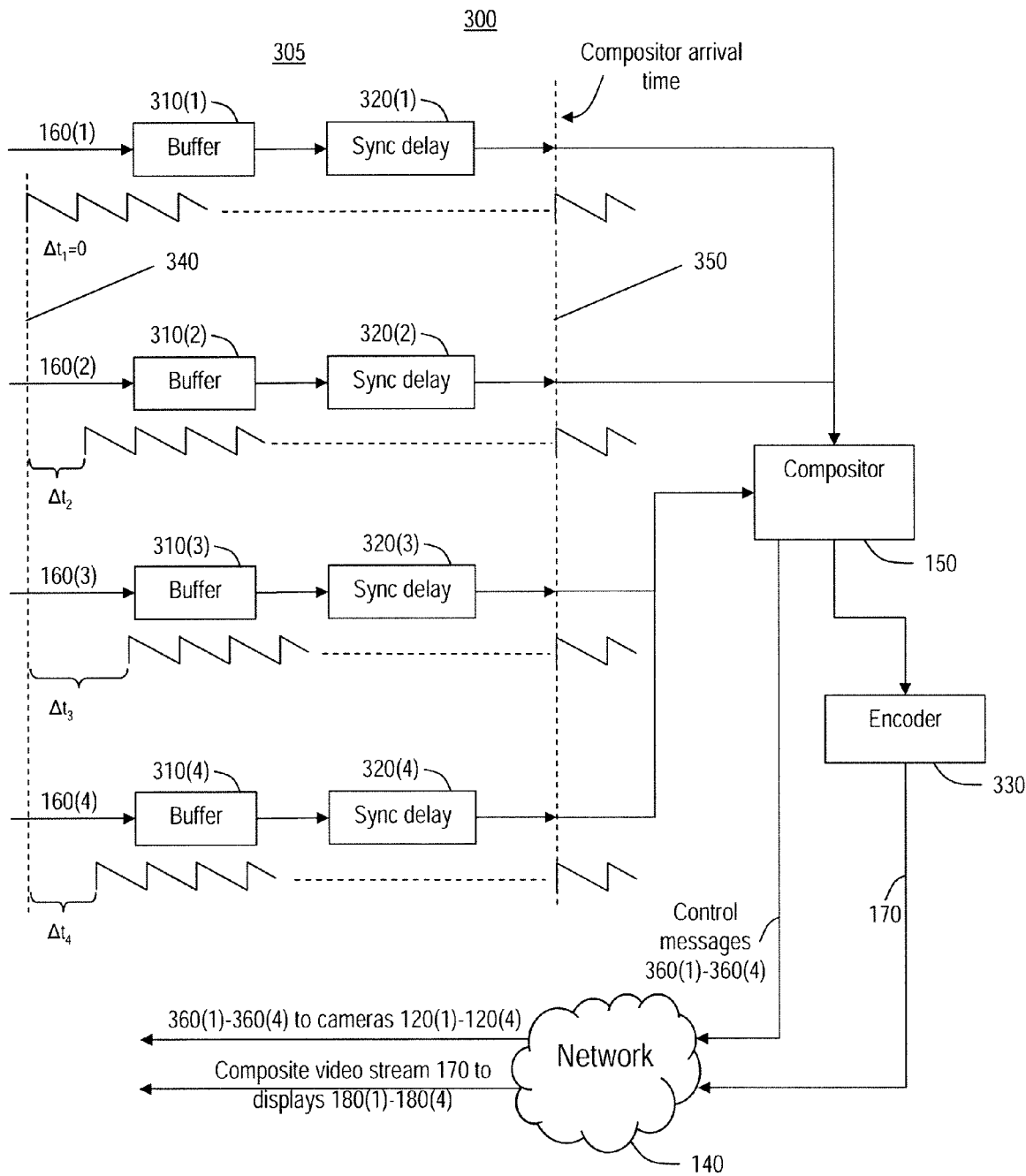

Receive at a video capture device, a control message configured to indicate an adjustment to a video capture frame rate — 610

Adjust the video capture frame rate in response to the control message to advance or retard a vertical synchronization point — 620

NETWORK SYNCHRONIZATION VIDEO FOR COMPOSITE VIDEO STREAMS

TECHNICAL FIELD

The present disclosure relates generally to video teleconferencing, and more specifically to synchronizing a plurality video streams at a composite video distribution device.

BACKGROUND

In certain video teleconferencing environments, each of a plurality of individuals has a camera, a microphone, and a display, the combination of is referred to herein as a teleconference endpoint. The video and audio from each endpoint is streamed to a central location where a video processing device, e.g., a Multi-point Control Unit (MCU), takes the video (and audio) from the various endpoints and redistributes the video to other endpoints involved in a conference session.

In some forms, the MCU acts as a video compositor and reformats the video by combining several video images onto a single screen image, thereby forming a "composite" image. The combination of various video feeds onto a single screen requires the reception of one whole frame from each video source in order to create the output frame. When the sources are asynchronous, each source uses a frame buffer. The average latency of these frame buffers is one-half a frame, or 16 milliseconds (ms) at a standard frame rate of 30 frames per second (fps), while the maximum latency is a full frame or approximately 33 ms. Latency may cause undesirable video and audio effects for those participating in the video teleconference.

BRIEF DESCRIPTION OF THE DRAWINGS

FIG. 3 is an example block diagram of a plurality of video streams of the conference endpoints that are processed by a video compositor to produce a composite image of the conference participants at the conference endpoints.

FIG. 6 is an example of a flowchart generally depicting the process for receiving signals to synchronize video for individual images of the conference participants.

DESCRIPTION OF EXAMPLE EMBODIMENTS

Overview

Techniques are provided for synchronizing upstream video sources in vertical synchronization time and in frame rate, so that a downstream device can create a composite image with low latency. At a video compositor device, a plurality of video streams are received that comprise at least first and second video streams. First and second vertical synchronization points associated with the first and second video streams are determined. A difference in time or timing offset between the first and second vertical synchronization points is determined. At least one message is generated that is configured to change a video capture frame rate associated with one or both of the first and second video streams to reduce the difference in time (timing offset) and the message is sent to video capture devices for one or both of the first and second video streams.

Techniques are also provided for upstream video sources, e.g., video capture devices or cameras, to receive a message configured to indicate an adjustment to a video capture frame rate. The video capture frame rate is adjusted in response to the message to advance or retard a vertical synchronization point of the video signal produced by the video capture device.

Example Embodiments

Figure 1:
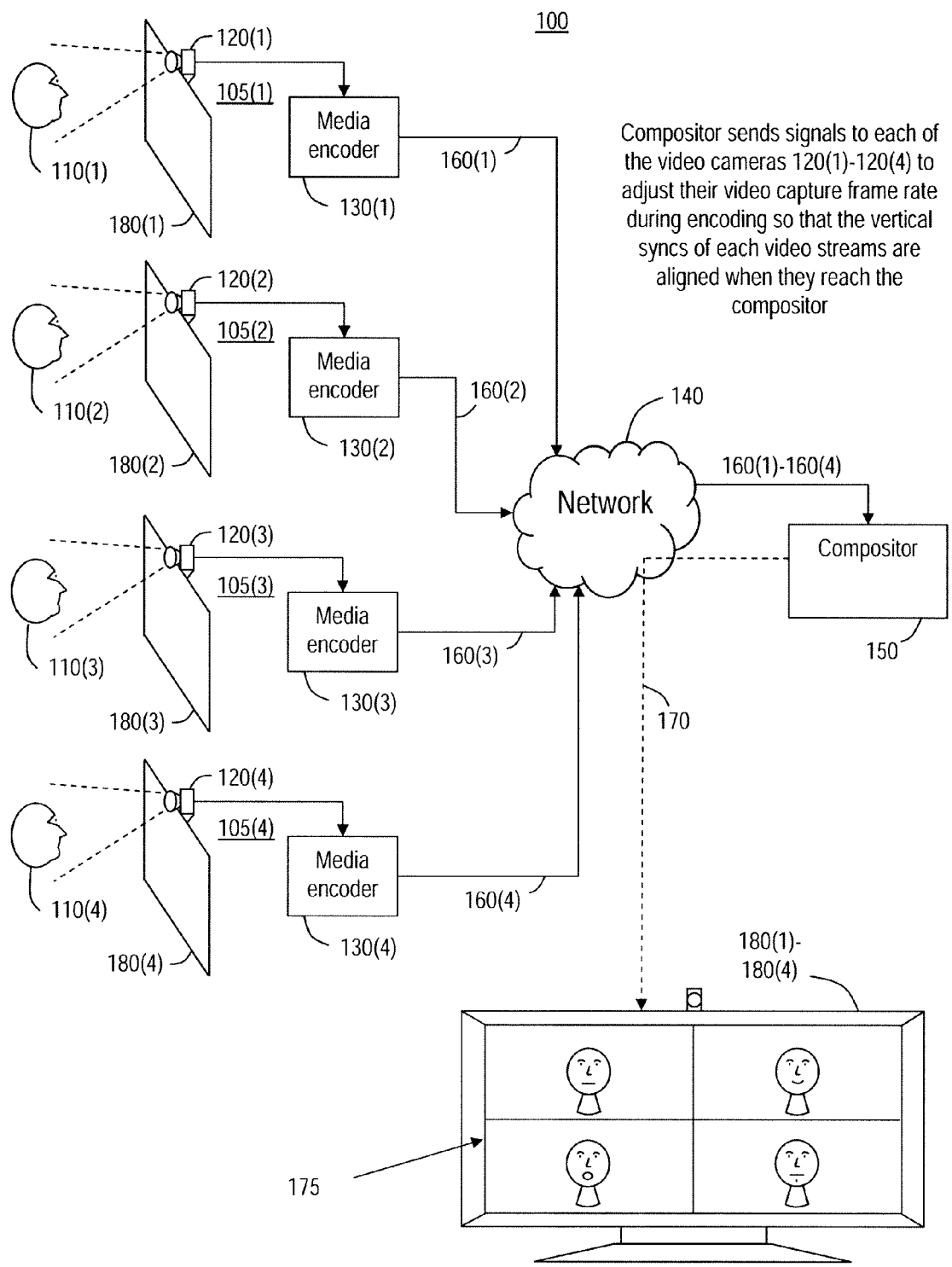
FIG. 1 is a block diagram showing an example of a video teleconferencing system comprising a plurality of endpoints (at each of which there is at least one conference participant) whose audio and video are distributed by a video compositor configured to send synchronization signals to corresponding video capture devices.

Referring first to FIG. 1, a block diagram is shown for a video teleconferencing system 100 comprising a plurality of conference endpoints 105(1)-105(4) and a plurality of conference participants 110(1)-110(4), each at a corresponding conference endpoint. In this example, there is one conference participant at each endpoint, but it should be understood that there may be multiple participants at one or more of the endpoints and there may be more or less endpoints than the four shown in FIG. 1. Each endpoint 105(1)-105(4) comprises a video (and audio) capture device (e.g., video camera with one or more microphones), and a media encoder/decoder. Endpoint 105(1) comprises camera 120(1), media encoder/decoder 130(1), and display 180(1); endpoint 105(2) comprises camera 120(2), media encoder/decoder 130(2), and display 180(2) and so on. Each of the endpoints 105(1)-105(4) connects to network 140 as does a compositor 150.

Each of the media encoders 130(1)-130(4) encodes audio and video from cameras 120(1)-120(4) into transport streams 160(1)-160(4). The transport streams 160(1)-160(4) are transmitted to the compositor 150 via network 140. At the compositor 150, the video from transport streams 160(1)-160(4) is encoded into a composite video stream 170. A single composite frame of the composite video stream is shown at 175. The composite video stream is sent to each of media encoders/decoders to decode the composite video stream for display on a corresponding one of the displays 180(1)-180(4) at the endpoints 105(1)-105(4) so that each participant may see each of the other participants during a conference session, as shown. The network 140 may be an intranet or campus network, the Internet, or other Wide Area Network (WAN), or combinations thereof.

Each of the video streams produced by the cameras 120(1)-120(4) is generated according to each camera's internal electronics, and as such, video frames are generated that start at different times, i.e., the video from cameras 120(1)-120(4) are not necessarily synchronized with each other. The video streams may become further shifted in time relative to one another by any network latency that may be introduced during transit via the network 140 to the compositor 150. In order to produce a composite video, the transport streams 160(1)-160(4) are buffered and then decoded. The buffering allows the compositor 150 to align the video from each of the cameras 120(1)-120(4) in order to remove any time differences or latencies between corresponding video frames. The composite image frames are then encoded for transport in composite video stream 170. Buffering also introduces additional undesired latency in the system 100. According to the techniques described herein, latency is reduced by sending a control message or signal back to each of the cameras 120(1)-120(4) to adjust, i.e., advance or retard, their video capture frame rate so that eventually the vertical synchronization ("sync") points or "syncs"/"V-syncs" of each video frame arrive at the compositor at roughly the same time.

Figure 2A:
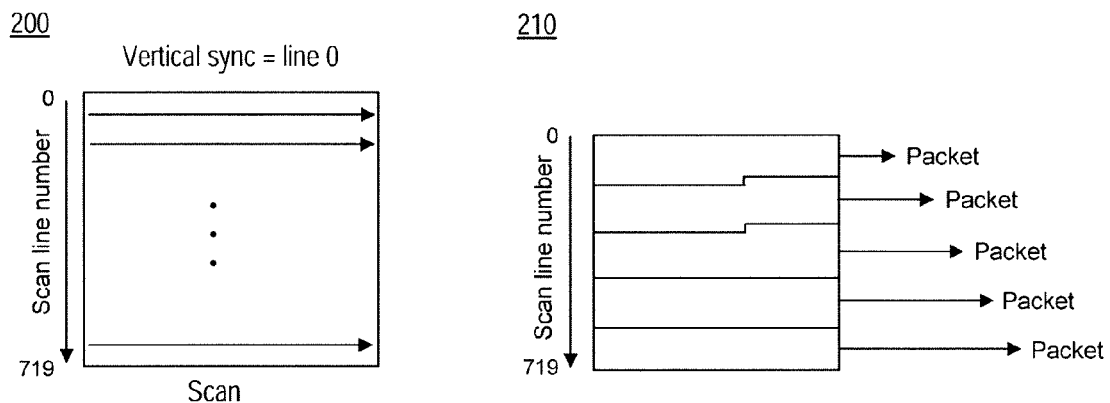
FIGS. 2a and 2b are diagrams showing an example of the mechanics of video generation for individual video streams of the conference endpoints in which a frame capture rate is adjusted by a video compositor.
Figure 2B:
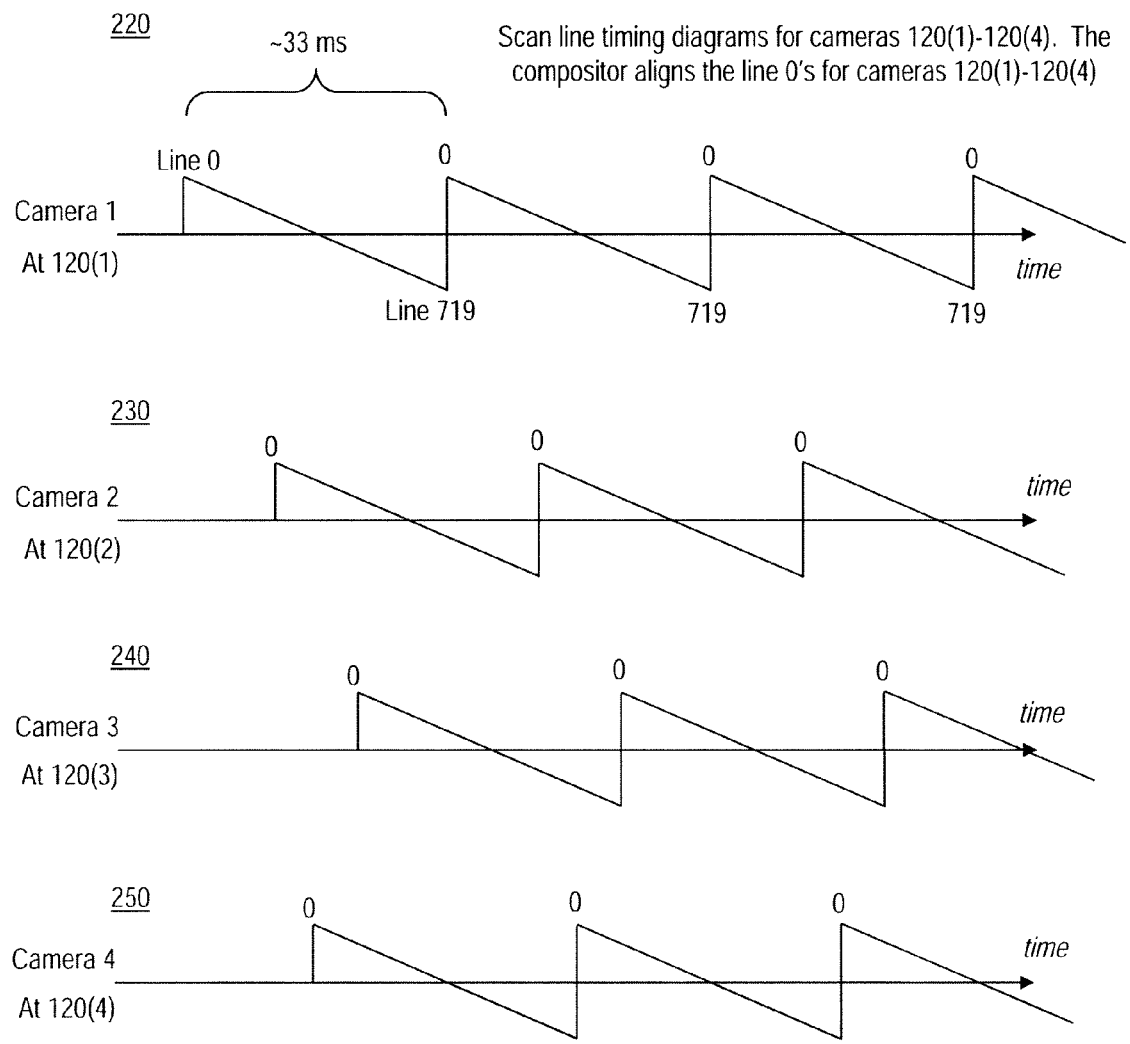

Referring to FIGS. 2a and 2b, and with continued reference to FIG. 1, an example is shown of the mechanics of video generation for individual video streams of the conference participants in which a frame capture rate is adjusted by a video compositor, e.g., compositor 150. At 200, video is captured by a camera, e.g., one of cameras 120(1)-120(4), using pixel scans from left to right. In this example, each video frame has 720 horizontal lines numbered 0 to 719, as shown. The number of horizontal scan lines may vary depending on the desired video quality and the capabilities of the camera. The start of each video frame is delineated by a vertical sync at line zero ("line 0").

At 210, as the video is transmitted from the camera to the media encoder/decoder, e.g., one of media encoders/decoders 130(1)-130(4), it is encoded for transport, e.g. in a Motion Pictures Experts Group (MPEG)-2 Transport Stream (TS). The encoded video stream may be encapsulated into MPEG packets, subsequently encapsulated into IP packets, and further encapsulated using Real-time Transport Protocol (RTP) for transport over network 150. Each video frame is compressed and packed into approximately 5 to 10 packets. The packets are emitted from the video encoder as soon as they are created, as shown. One packet is emitted approximately every 4 ms. Thus, the techniques described herein can optimize the timing of frames at a subframe or video slice level.

In FIG. 2b, at 220-250, example scan line timing diagrams are shown for video generated by cameras 120(1)-120(4). Because each camera has different power on times, and may have different internal circuitry and clocks, the vertical sync points between the video frames produced by the cameras 120(1)-120(4) occur at different points in time relative to one another. The vertical sync points may also drift relative to one another due to clock and temperatures differences at each camera's location. In this example, frames are produced at 30 frames per second (fps) or one frame approximately every 33 ms.

At 220, a first camera's, e.g., camera 120(1), scan line timing diagram is shown with an earliest vertical sync at line 0. At 230, camera 120(2) has a vertical sync that starts later than the vertical sync for camera 120(1). At 240, camera 120(3) has a vertical sync that starts later than the vertical syncs for cameras 120(1) and 120(2), and at 250, camera 120(4) has a vertical sync that starts later than the vertical sync for camera 120(2), but earlier than the vertical sync for camera 120(3). The relative timing of the vertical syncs shown at 220-250 may also indicate the relative arrival times of the vertical syncs at the compositor 150. According to the techniques described herein, the compositor 150 sends a control signal back to each of the cameras 120(1)-120(4) to adjust their video capture frame rates in order to advance or retard the vertical syncs (as needed) such that each vertical sync arrives at the compositor at roughly the same time. This concept is shown in greater detail in FIG. 3.

Referring to FIG. 3, a block diagram is shown that depicts an example of the video processing the takes place at a multipoint control unit (MCU) 300 in a video teleconferencing system, where the compositor 150 referred to above resides in the MCU 300. The MCU 300 has a compositor pre-processing section 305 comprising buffers 310(1)-310(4) for each of the transport streams 160(1)-160(4), sync delay units 320(1)-320(4), and an encoder 330 configured to encode the composite video stream 170 produced by the compositor 150. A plurality of decoders may also be employed in MCU 300 to decode each of the transport streams 160(1)-160(4) after they are buffered and delayed. For ease of illustration, the buffers 310(1)-310(4), sync delay units 320(1)-320(4), and encoder 330 are shown separately from compositor 150. However, these components may be part of the compositor 150 itself, housed within the same chassis as the compositor 150, or in line or circuit cards that communicate on a common backplane or bus, e.g., a peripheral component interconnect (PCI) bus.

As shown in FIG. 3, each of the transport streams 160(1)-160(4) is buffered as it is received by buffers 310(1)-310(4), respectively. The buffers 310(1)-310(4) allow video to be accumulated such that each video frame can be later aligned when forming a composite picture. The sync delay units 320(1)-320(4) measure how much delay exists between the vertical syncs of each video frame within the transport streams 160(1)-160(4). To measure the various delays the sync delay units 320(1)-320(4) may set up a reference time 340 that is based on an earliest received vertical sync. The sync delay units 320(1)-320(4) may determine relative timing by examining, e.g., RTP headers for a Start of Frame (SOF) indication.

In this example, the reference time 340 is set up based on transport stream 160(1), with at $\Delta t_1$ of zero. The remaining time differences $\Delta t_2$, $\Delta t_3$, and $\Delta t_4$, are shown with approximately the same delays that are shown in FIG. 2. The sync delay units 320(1)-320(4) will then forward packets from each of the transport streams 160(1)-160(4) such that a vertical sync for each of the video frames decoded from each of the transport streams 160(1)-160(4) arrives at the compositor at approximately the same time, as shown at 350.

The compositor 150 generates a composite image frame for all the participants in the video teleconference, e.g., participants 110(1)-110(4) as shown in FIG. 1. The encoder 330 encodes the composite image frame, e.g., using MPEG-4 H.264 scalable video coding (SVC) coder/decoder (codec) into the composite video stream 170. The composite video stream 170 is multicast back to the endpoints, e.g., using an IP/RTP stream. At the endpoints, each participant can view the composite image frames of the composite video stream and listen to the current lecture or conversation occurring during the conference session.

The compositor 150 also generates and sends feedback signals or control messages 360(1)-360(4) to corresponding cameras 120(1)-120(4) to advance or retard their respective video capture frame rates so that eventually the vertical syncs of each video frame arrive at the compositor at approximately the same time. The compositor 150 uses information from each of the sync delay units 320(1)-320(4) and generates the feedback signals 360(1)-360(4) such that the delay through the sync delay units 320(1)-320(4) is minimized. The process for synchronizing the vertical syncs at the compositor 150 has been briefly described in connection with FIGS. 1-3 and will generally be described in connection with FIGS. 4a and 4b. The process will be described in greater detail in connection with FIGS. 5 and 6, and a specific example of synchronization will be described in connection with FIGS. 7-9.

Figure 4A:
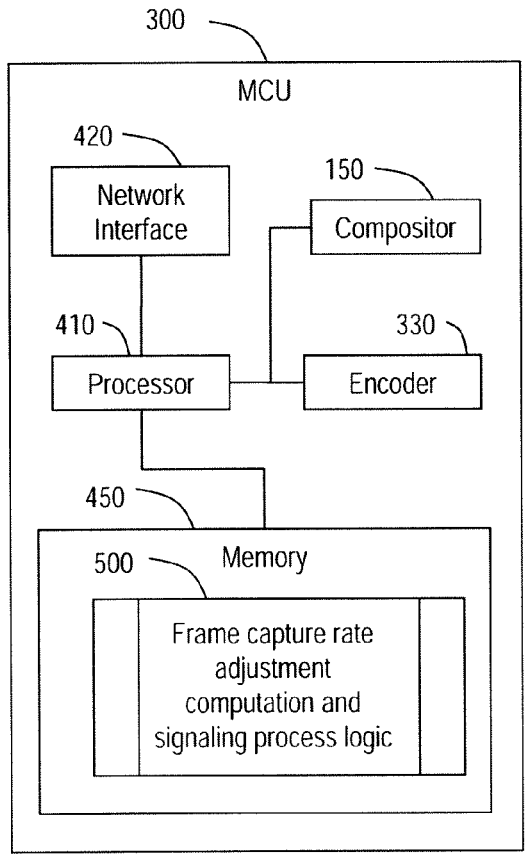
FIG. 4a is an example block diagram of a network device that is configured to generate a composite video of the conference participants from a plurality of video streams.

Referring now to FIG. 4a, an example block diagram of a network device, e.g., MCU 300, that is configured to perform or execute a frame capture rate adjustment computation and signaling process logic 500, is described. The compositor 300 comprises a processor 410, a network interface unit 420, compositor 150, image encoder 330 (referred also in connection with FIG. 3), and a memory 450. The network interface unit 420 enables communication between the MCU 300 and other network elements in the system 100, such as by way of wired, wireless, or optical interfaces. The memory 450 stores instructions for the frame capture rate adjustment computation and signaling process logic 500. The frame capture rate adjustment computation and signaling process logic 500 computes information configured to indicate whether to advance, retard, or maintain a video frame capture rate for a video capture device, e.g., for one or more of the cameras 120(1)-120(4). While the compositor 150 is shown as a separate block in FIG. 4a, it is to be understood that its functions may be performed by software or firmware logic executed by processor 410.

The processor 410 is a data processing device, e.g., a microprocessor, microcontroller, systems on a chip (SOCs), or other fixed or programmable logic. The processor 410 interfaces with the memory 450 to execute instructions stored therein. Memory 450 may be any form of random access memory (RAM) or other tangible (non-transitory) memory media that stores data used for the techniques described herein. The memory 450 may be separate or part of the processor 410. Instructions for performing the frame capture rate adjustment computation and signaling process logic 500 may be stored or encoded in the memory 450 for execution by the processor 410.

The functions of the processor 410 may be implemented by a processor or computer readable tangible (non-transitory) medium encoded with instructions or by logic encoded in one or more tangible media (e.g., embedded logic such as an application specific integrated circuit (ASIC), digital signal processor (DSP) instructions, software that is executed by a processor, etc.), wherein the memory 450 stores data used for the computations or functions described herein (and/or to store software or processor instructions that are executed to carry out the computations or functions described herein). Thus, the process 500 may be implemented with fixed logic or programmable logic (e.g., software/computer instructions executed by a processor or field programmable gate array (FPGA)), or the processor or computer readable tangible medium may be encoded with instructions that, when executed by a processor, cause the processor to execute the process 500.

Figure 4B:
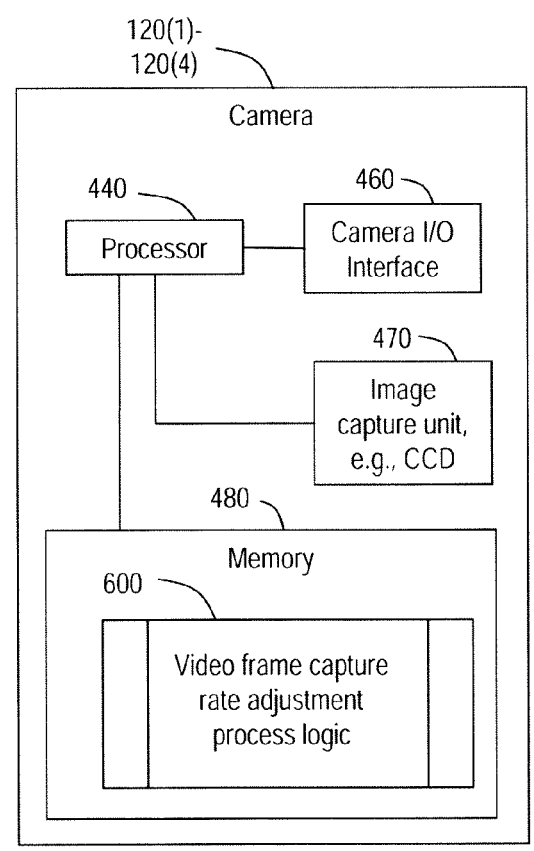
FIG. 4b is an example block diagram of an endpoint device that is configured to generate individual video and audio streams for the conference participants.

Referring to FIG. 4b, an example block diagram of relevant portions of a video capture device, e.g., one of the cameras 120(1)-120(4), configured to stream video is now described. This device comprises a processor 440, a camera input/output (I/O) interface unit 460, an image capture unit 470 and memory 480. The processor 440 and memory 480 may be configured as described above for processor 410 and memory 450 in connection with FIG. 4a for MCU 300. The camera I/O interface unit 460 is configured to stream raw video and to perform network I/O functions similar to those described for the network interface unit 420 of the compositor 150. The image capture unit 470 operates as an image sensor for the capturing of video images. For example, image capture unit 470 may be a Charge-Coupled Device (CCD). The device shown in FIG. 4 is configured to adjust its video frame capture rate using video frame capture rate adjustment process logic 600. The memory 480 stores instructions for the video frame capture rate adjustment generation process logic 600. The video frame capture rate adjustment process logic 600 adjusts the video fame capture rate for the camera.

Figure 5:
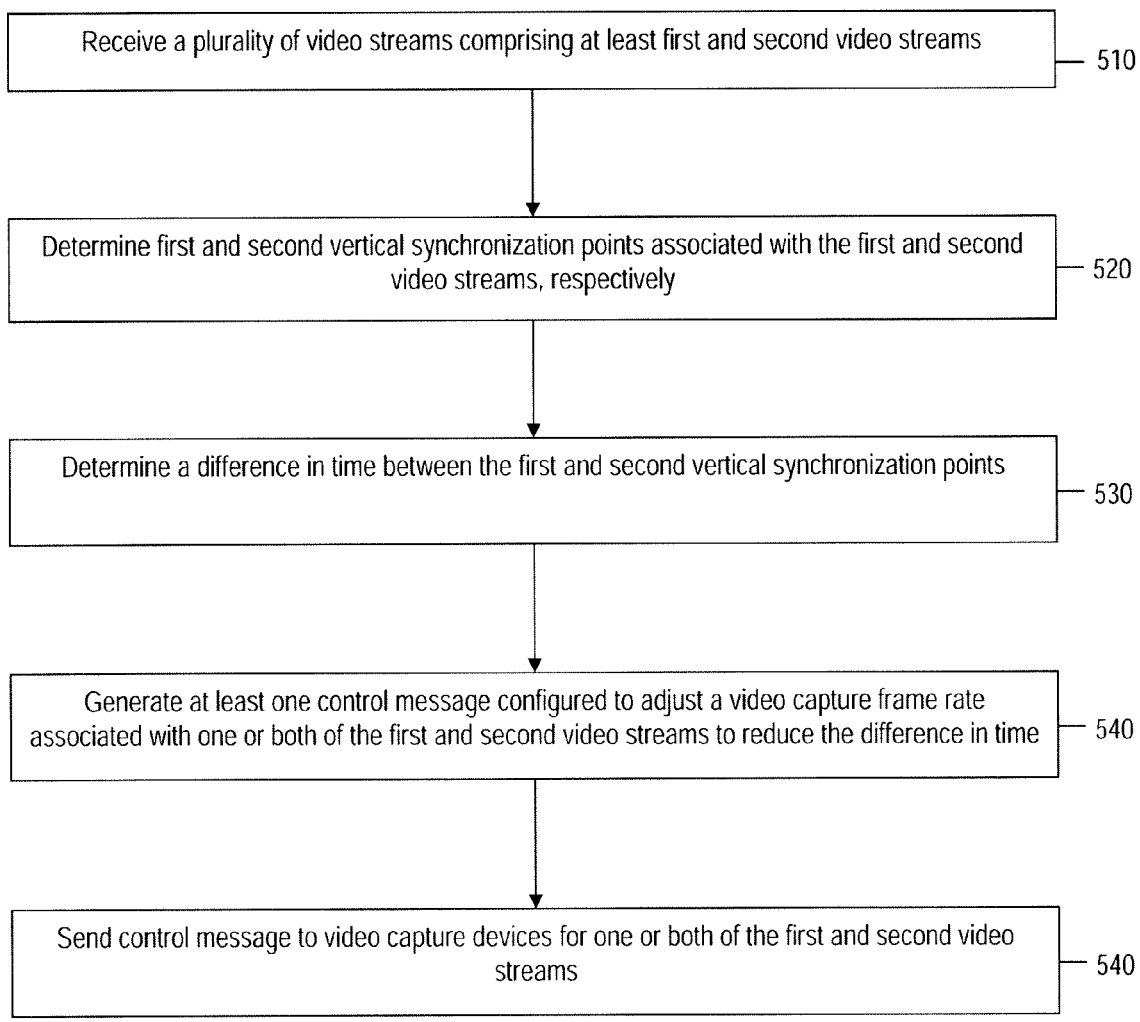
FIG. 5 is an example of a flowchart generally depicting a process for generating signals to synchronize video for individual images of the conference participants.

Turning now to FIG. 5, a flowchart depicting the frame capture rate adjustment computation and signaling process logic 500 will now be described. At 510, at a network device comprising or configured to perform operations of a video compositor (e.g., at MCU 300), a plurality of video streams are received. For example, the plurality of video streams comprises at least first and second video streams. At 520, a first vertical synchronization point is determined for the first video stream and second vertical synchronization point is determined for the second video stream. The first and second vertical synchronization points correspond to vertical syncs, as described above, of the video frames within the least first and second video streams, respectively. At 530, a difference in time between the first and second vertical synchronization points is determined. In one example, the difference in time is $\Delta t_2$ as shown in FIG. 3, as the difference in time between video frames in transport streams 160(1) and 160(2).

At 540, at least one control message is generated that is configured to adjust (change) a video capture frame rate associated with one or both of the first and second video streams to reduce the difference in time between the first and second vertical synchronization points. At 550, a control message is sent to the video capture device for one or both of the first and second video streams, e.g., the control message(s) could be sent to one or both of the cameras 120(1) and 120(2) that generate video frames for transport streams 160(1) and 160(2). Over time the first and second vertical synchronization points will converge. As the first and second vertical synchronization points converge, control messages may be generated to dynamically adjust the corresponding video capture frame rates or to maintain a current frame rate. If it is determined at 530 that there is not a significant difference in time, then control messages for one or both of the first and second video streams may be configured to maintain the first and second vertical synchronization points.

Depending on the magnitude of the adjustment rates for the various vertical syncs, updates are periodically computed to the time differences between the various vertical syncs and the video capture frame rates are dynamically adjusted accordingly. Thus, the control message may be configured to dynamically adjust the video capture frame rate for one or both of the first and second video streams based on a rate of convergence between the first and second vertical synchronization points. The control message generated for the first video capture device may be different than the control message generated for the second video capture device. For example, the control message for the first video capture device may be configured to cause the first video capture device to advance its V-sync and the control message for the second video capture device may be configured to cause the second video capture device to retard its V-sync so that the V-sync of the first video stream and the V-sync of the second video stream converge to align with each other. Moreover, the first and second video streams is only an example and, as depicted in FIGS. 1-3, there may be 3, 4 or more video streams whose V-syncs need to be controlled to achieve the desired timing alignment described herein.

Said another way, the process 500 involves a network element, e.g., MCU 300 or other element configured to perform compositor operations, receiving a plurality of video streams (at least first and second video streams) over a packet-based network. The network element records the arrival time of each packet, and determines which packets correspond to the start and end of each video frame, e.g., by examining the RTP headers. The network element combines the video streams, one frame from each video stream, to produce a composite video frame as part of a composite video stream. The network element is configured to minimize the latency of the system by minimizing the time that packets sit in their respective buffers before they are combined. To do this, the downstream element synchronizes the streams to a video frame capture rate. The vertical sync or SOF is timed so that the last line of that video source arrives "just-in-time" to be combined into the output composite video frame.

Referring to FIG. 6, a flowchart is shown that depicts the process for adjusting the video fame capture rate at a video capture device using video frame capture rate adjustment process logic 600. At 610, a control message that is configured to indicate an adjustment to a video capture frame rate is received at the video capture device, e.g., a camera. At 620, the video frame capture rate is adjusted in response to the control message to advance or retard a vertical synchronization point for video frames produced by the camera. The control message may also be configured to indicate a maintenance video frame capture rate.

The upstream video sources, i.e., video cameras, include a means to control the raster scan rate of the image sensor within. One advantage provided by the techniques described herein is that a multi-megahertz clock or hard synchronization signal does not need to be fed to the camera from the downstream element. The camera uses its own crystal controlled pixel clock and only the start of the video frame needs to be synchronized.

Figure 7:
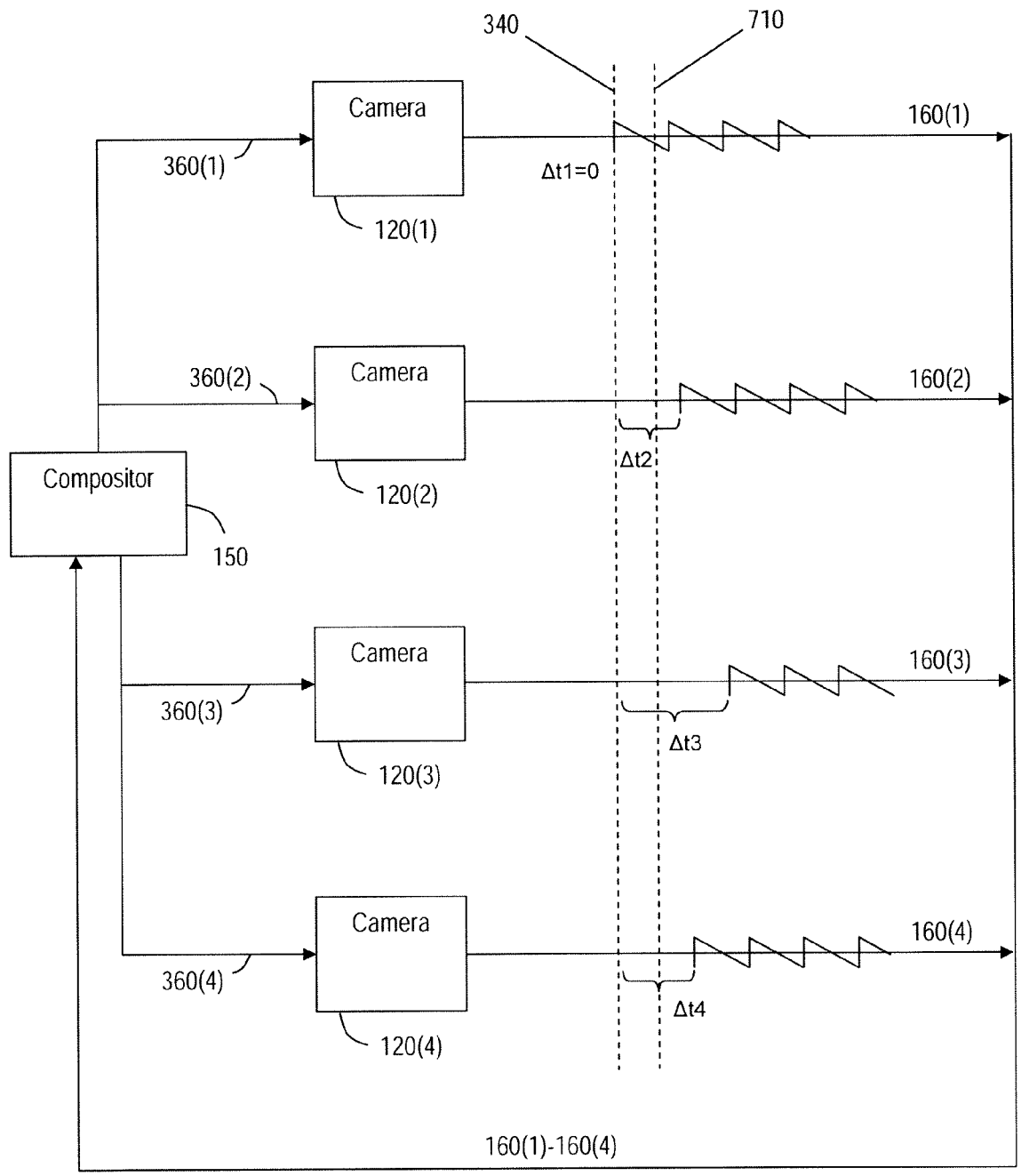
FIGS. 7-9 are an example timing diagrams illustrating a process of successive synchronization of video for individual images of the conference participants.
Figure 8:
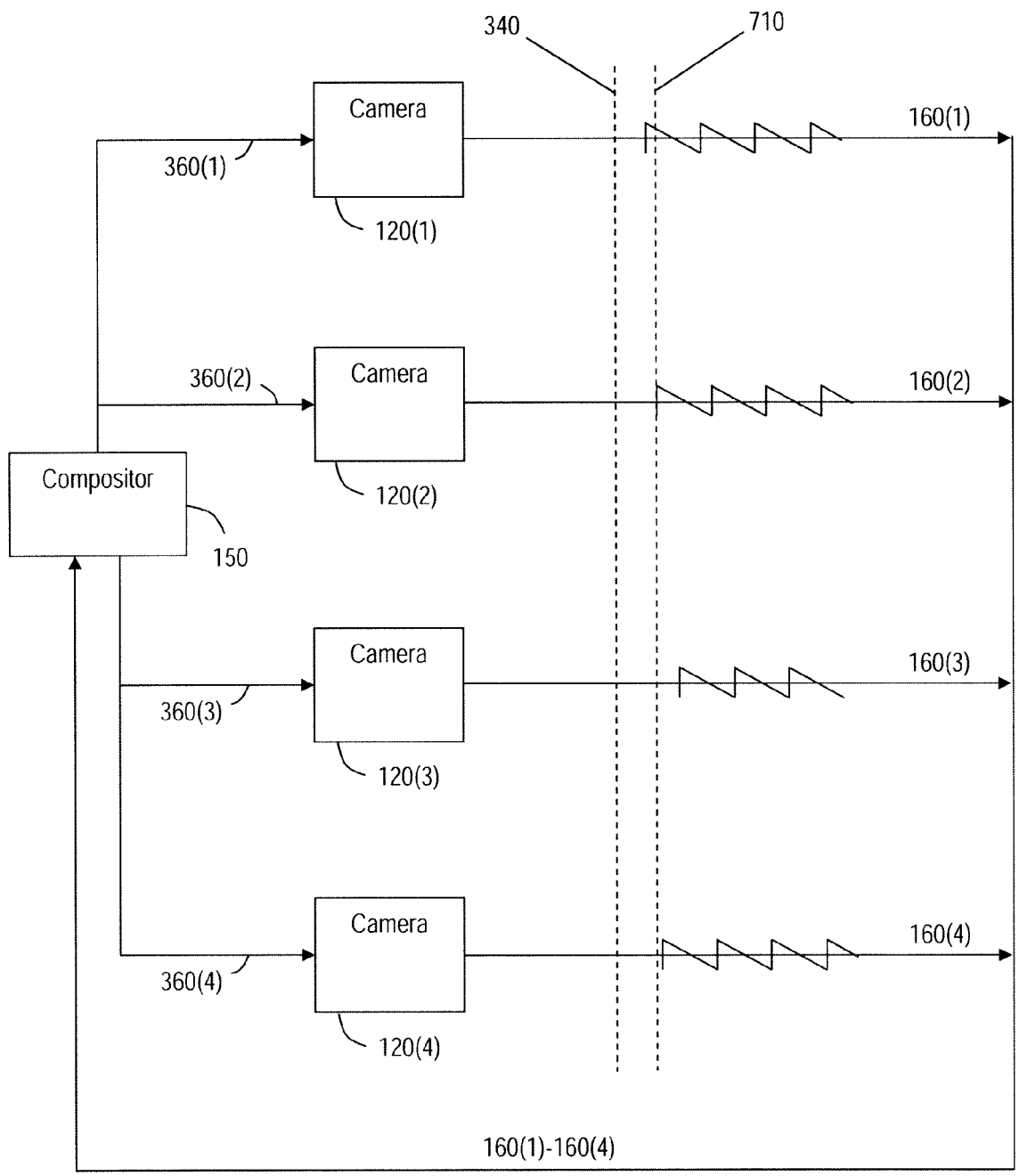
Figure 9:
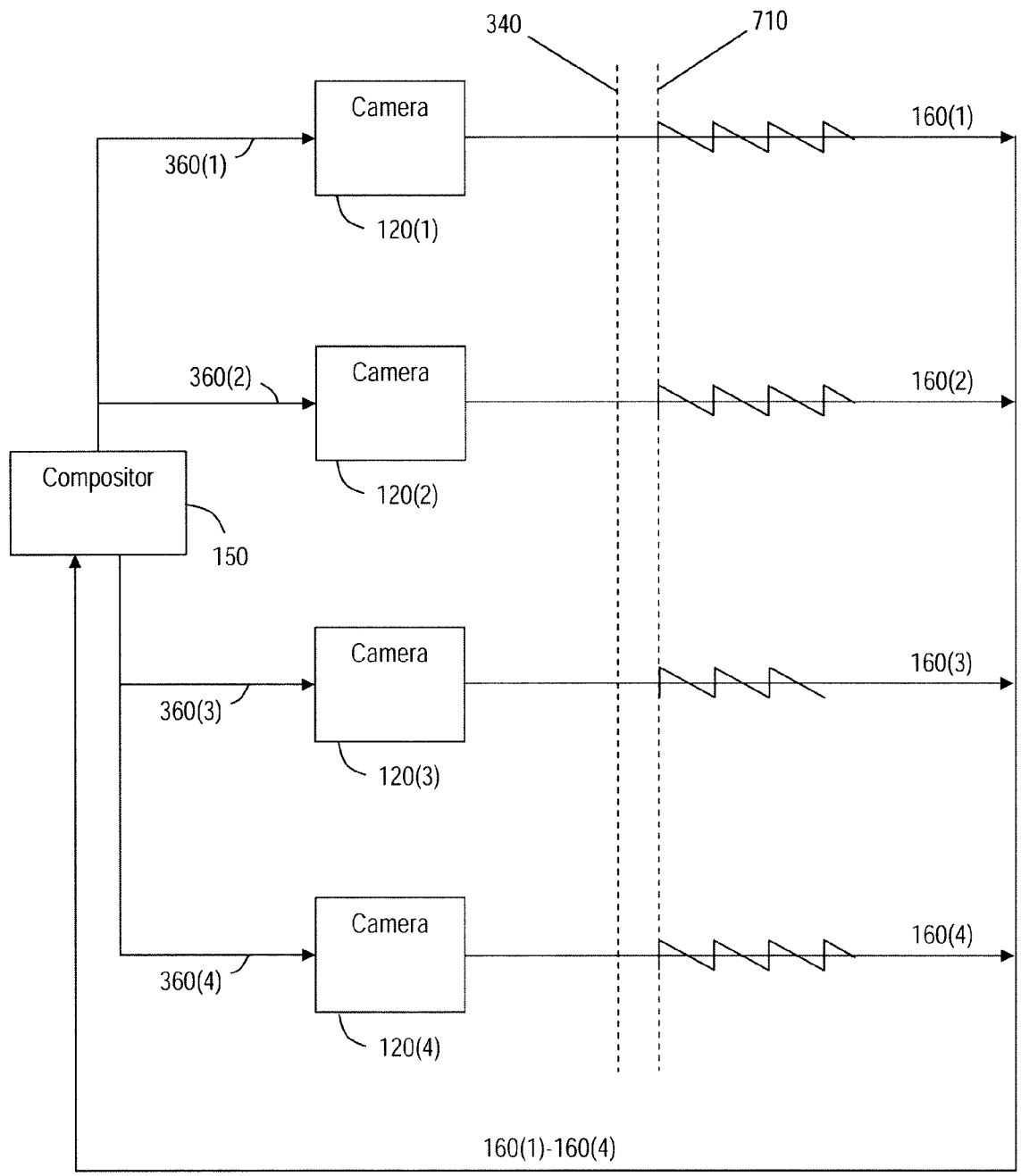

FIGS. 7-9 are example timing diagrams illustrating a process of successive synchronization of video for individual images of the conference participants according to the techniques described herein. In FIGS. 7-9, the compositor 150 is referred to as the device that generates the control messages but it is to be understood that these control messages may be generated by a network element, e.g., MCU or other device that is configured to perform the compositing operations and the frame capture rate adjustment computation and signaling process logic 500 in connection with the plurality cameras 120(1)-120(4) (from FIG. 1) that are configured to implement the video frame capture rate adjustment process logic 600.

A video teleconference has just begun and cameras 120(1)-120(4) are streaming video frames that have been encoded into transport streams 160(1)-160(4) destined for compositor 150, as shown. A baseline or reference time is shown at 340 that represents the earliest arrival time at the compositor 150 from among the vertical syncs for video frames within transport streams 160(1)-160(4). The reference time or timing point 340 is the same timing point 340 shown in FIG. 3. In this example, the earliest vertical sync is associated with transport stream 160(1), and therefore $\Delta t_1 = 0$. For ease of illustration, the delays $\Delta t_2$, $\Delta t_3$, and $\Delta t_4$, shown in FIG. 7 are intended to represent the same delays that are shown in FIG. 3.

The compositor 150 computes the delays between each of the vertical syncs in transport streams 160(1)-160(4). In this example, a target timing point 710 is generated by compositor 150. The target timing point 710 is a convergence target for all of the vertical syncs, as will be described hereinafter. The target timing point may also be considered as a target video frame capture rate. The target timing point 710 may be an average or weighted average of the delays, a root-mean square (RMS) time based on the relative delays, based on known statistical, linear, or non-linear characteristics of the system 100, and the like. In another example, the target timing point 710 may be eliminated and the vertical sync may be adjusted so that they converge to each other.

In this example, the compositor 150 may send control message/signal 360(1) to retard the video frame capture rate for camera 120(1) so the vertical sync starts to arrive at the compositor 150 later in time relative to timing point 340 and move toward target timing point 710. Similarly, the compositor 150 may send control message/signals 360(2)-360(4) to advance the video frame capture rate for cameras 120(2)-120(4), respectively, so that the vertical syncs start to arrive at the compositor 150 earlier in time relative to timing point 340 and progress toward target timing point 710. The control message to the respective cameras may contain an adjustment on a percentage basis, a video frame capture frequency basis, or on an incremental time basis, thereby forming a closed loop that does not require clock or timing signals from the compositor, i.e., an absolute frame timing lock is not required. For example, the message may indicate that a camera should increase the video frame capture rate by 0.1%, or from 30 Hz to 30.2 Hz, or capture a frame in 32.5 ms instead of 33.3 ms.

Referring to FIG. 8, the vertical syncs from FIG. 7 are shown after a period of time, e.g., after 250 video frames have been transmitted or approximately eight seconds. The video sync associated with transport stream 160(1) has moved to the right toward target timing point 710 and the video syncs associated with transport streams 160(3) and 160(4) have moved to the left toward target timing point 710, and the video sync associated with transport stream 160(2) has reached the target timing point 710. At this point in time, the compositor 150 may send additional control signals/messages 360(2)-360(4) to cameras 120(2)-120(4), respectively, to reduce the rate that was included in a previous adjustment message, thereby slowing the rate of convergence to the target timing point 710 for the corresponding vertical syncs. Since the vertical sync for transport stream 160(2) has reached the target timing point 710, the compositor 150 may send a control message 360(1) to camera 120(1) to maintain the vertical sync at the target timing point 710.

The control messages 360(1)-360(4) may be configured to dynamically adjust a video capture frame rate for the transport streams 160(1)-(4) generated by cameras 120(2)-120(4), respectively, based on differences in time between the vertical synchronization points and the vertical synchronization reference or target timing point 710. Alternatively, the control messages 360(1)-360(4) may be configured to dynamically adjust a video capture frame rate for the transport streams 160(1)-(4) generated by cameras 120(2)-120(4), respectively, based on rates of convergence between the vertical synchronization points and the vertical synchronization reference or target timing point 710. The target timing point 710 may also be dynamically adjusted based on differences in time between the vertical synchronization points and/or rates of convergence of the vertical synchronization points.

Referring to FIG. 9, the vertical syncs from FIG. 8 are shown after an additional period of time, e.g., after 250 additional video frames have been transmitted, or 500 frames in total since the start time shown in FIG. 7. All of the video syncs associated with transport streams 160(1)-160(4) have reached the target timing point 710. At this point in time, the compositor 150 may send additional control messages 360 (1)-360(4) to cameras 120(1)-120(4), respectively, to maintain the vertical syncs at the target timing point 710. The compositor 150 make additional adjustments to bring all of the cameras as close as possible to a standard video frame capture rate of 30 fps, i.e., the target timing point 710 may be dynamically adjusted to 30 fps, while considering network latency for the individual network paths taken by each of transport streams 160(1)-160(4).

Techniques have been described for upstream video sources to be synchronized in V-sync time and in frame rate, so that a downstream device can create a composite image with low latency. At a video compositor device, a plurality of video streams are received that comprise at least first and second video streams. First and second vertical synchronization points associated with the first and second video streams points are determined. A difference in time between the first and second vertical synchronization points is determined. At least one message is generated that is configured to change a video capture frame rate associated with one or both of the first and second video streams to reduce the difference in time and the message is sent to video capture devices for one or both of the first and second video streams.

Techniques also have been described for upstream video sources, e.g., a video capture devices or cameras to receive a message configured to indicate an adjustment to a video capture frame rate. The video capture frame rate is adjusted in response to the message to advance or retard a vertical synchronization point.

In summary, a downstream video sink sends messages to upstream video sources to adjust their video scan timing. The system achieves low latency from the camera to the combining video output by not using buffer delays to synchronize two pictures headed for the same display. Thus, extremely low latency video communication is achieved when two or more video streams are combined into a single video stream.

The above description is intended by way of example only.

What is claimed is:

1. A method comprising:
   receiving at a video compositor device a plurality of video streams comprising at least first and second video streams;
   determining first and second vertical synchronization points associated with the first and second video streams, respectively;
   determining a difference in time between the first and second vertical synchronization points;
   generating at least one control message configured to change a video capture frame rate of an image sensor used for generating one of the first and second video streams to reduce the difference in time; and
   sending the control message to a video capture device comprising the image sensor used for generating one of the first and second video streams, wherein the control message is configured to control the image sensor of the video capture device.

2. The method of claim 1, wherein generating comprises generating the at least one control message configured to adjust the video capture frame rate for one or both of the first and second video streams based on the difference in time between the first and second vertical synchronization points.

3. The method of claim 1, wherein generating comprises generating the at least one control message configured to adjust the video capture frame rate for one or both of the first and second video streams based on a rate of convergence between the first and second vertical synchronization points.

4. The method of claim 1, wherein generating comprises generating video capture frame rate control messages configured to change the video capture frame rate for one or both of the first and second video streams using one of a percentage basis, video capture frequency basis, or on an incremental time basis.

5. The method of claim 1, further comprising generating a vertical synchronization reference, and wherein generating comprises generating control messages configured to cause the first and second vertical synchronization points to converge to the vertical synchronization reference.

6. The method of claim 5, wherein generating comprises generating control messages configured to adjust a video capture frame rate for one or both of the first and second video streams based on the difference in time between the first vertical synchronization point and the vertical synchronization reference, and the difference in time between the second vertical synchronization point and the vertical synchronization reference.

7. The method of claim 5, wherein generating comprises generating control messages configured to adjust the video capture frame rate for one or both of the first and second video streams based on a rate of convergence between the first and second vertical synchronization points and the vertical synchronization reference.

8. The method of claim 1, further comprising:
   receiving the control message at the video capture device; and
   adjusting the video capture frame rate in response to the control message to advance or retard a vertical synchronization point associated with the video stream produced by the video capture device.

9. A method comprising:
   receiving at a video capture device a control signal configured to indicate an adjustment to a video capture frame rate of an image sensor during capture of a video stream; and
   adjusting the video capture frame rate in response to the control signal to advance or retard a first vertical synchronization point associated with a first video stream by controlling the image sensor of the video capture device,
   wherein the control signal provides control information based in part on a difference in time between the first synchronization point and a second vertical synchronization point associated with a second video stream.

10. An apparatus comprising:
    a network interface unit configured to receive a plurality of video streams comprising at least first and second video streams;
    a processor configured to be coupled to the network interface unit and configured to:
      determine first and second vertical synchronization points associated with the first and second video streams, respectively;
      compute a difference in time between the first and second vertical synchronization points;
      generate at least one control signal configured to change a video capture frame rate of an image sensor used to generate one of the first and second video streams to reduce the difference in time; and
      send the control signal via the network interface unit to a video capture device comprising the image sensor used to generate one of the first and second video streams, wherein the control message is configured to control the image sensor of the video capture device.

11. The apparatus of claim 10, wherein the processor is configured to generate the at least one control signal to adjust the video capture frame rate for one or both of the first and second video streams based on the difference in time between the first and second vertical synchronization points.

12. The apparatus of claim 10, wherein the processor is configured to generate the at least one control signal configured to adjust the video capture frame rate for one or both of the first and second video streams based on a rate of convergence between the first and second vertical synchronization points.

13. The apparatus of claim 10, wherein the processor is further configured to generate a vertical synchronization reference, and wherein the processor is configured generate control signals configured to cause the first and second vertical synchronization points to converge to the synchronization reference.

14. A system comprising the apparatus of claim 10, further comprising a video capture device configured to:
   receive the control signal; and
   adjust the video capture frame rate in response to the control signal to advance, retard, or maintain a vertical synchronization point.

15. A non-transitory computer readable medium storing instructions that, when executed by a processor, cause the processor to:
   receive a plurality of video streams comprising at least first and second video streams;
   determine first and second vertical synchronization points associated with the first and second video streams, respectively;
   compute a difference in time between the first and second vertical synchronization points;
   generate least one control signal configured to change a video capture frame rate of an image sensor used to generate one of the first and second video streams to reduce the difference in time; and
   send the control signal to a video capture device comprising the image sensor used to generate one of the first and second video streams, wherein the control message is configured to control the image sensor of the video capture device.

16. The non-transitory computer readable medium of claim 15, wherein the instructions that generate comprise instructions that cause the processor to generate the at least one control signal configured to adjust the video capture frame rate for one or both of the first and second video streams based on the difference in time between the first and second vertical synchronization points.

17. The non-transitory computer readable medium of claim 15, wherein the instructions that generate comprise instructions that cause the processor to generate the at least one control signal configured to adjust the video capture frame rate for one or both of the first and second video streams based on a rate of convergence between the first and second vertical synchronization points.

18. The non-transitory computer readable medium of claim 15, further comprising instructions that, when executed by a processor, cause the processor to generate a vertical synchronization reference, and wherein the instructions that generate comprise instructions that cause the processor to generate control signals configured to cause the first and second vertical synchronization points to converge to the synchronization reference.

19. The non-transitory computer readable medium of claim 18, wherein the instructions that generate comprise instructions that cause the processor to generate control signals configured to adjust a video capture frame rate for one or both of the first and second video streams based on the difference in time between the first vertical synchronization point and the vertical synchronization reference, and the difference in time between the second vertical synchronization point and the vertical synchronization reference.

20. The non-transitory computer readable medium of claim 18, wherein the instructions that generate comprise instructions that cause the processor to generate control signals configured to adjust the video capture frame rate for one or both of the first and second video streams based on a rate of convergence between the first and second vertical synchronization points and the vertical synchronization reference.

* * * * *